United States Patent [19]

Johnson et al.

[11] Patent Number: 5,178,924
[45] Date of Patent: Jan. 12, 1993

[54] RELEASE LINER

[75] Inventors: Michael A. Johnson, Stillwater; Maurice H. Kuypers, Oakdale, both of Minn.

[73] Assignee: Minnesota Mining and Manufacturing Company, St. Paul, Minn.

[21] Appl. No.: 716,076

[22] Filed: Jun. 17, 1991

[51] Int. Cl.$^5$ ............................................. A61F 13/02
[52] U.S. Cl. ..................................... 428/40; 428/105; 428/113; 428/247; 428/285; 428/286; 428/287
[58] Field of Search ................. 428/40, 105, 113, 284, 428/285, 286, 287, 247, 354, 352, 914, 915; 604/389, 390

[56] References Cited

U.S. PATENT DOCUMENTS

| | | | |
|---|---|---|---|
| 3,971,866 | 7/1976 | Johnson | 428/40 |
| 4,287,255 | 9/1981 | Wong | 428/40 |
| 4,769,283 | 9/1988 | Sipinen | 428/40 |
| 4,830,915 | 5/1989 | Diaz-Kotti | 428/113 |
| 4,927,709 | 5/1990 | Parker | 428/40 |
| 5,057,372 | 10/1991 | Imfeld | 428/412 |

Primary Examiner—Ellis P. Robinson
Assistant Examiner—Nasser Ahmad
Attorney, Agent, or Firm—Gary L. Griswold; Walter N. Kirn; Robert W. Sprague

[57] ABSTRACT

A release liner comprising:
(a) a reinforced, non-woven sheet composite comprising two layers, one of the layers being composed of a plurality of substantially randomly orientated fibers and the other layer being composed of substantially lineally-aligned fibrous reinforcement material; and
(b) a release layer on one or more of the layers of the non-woven sheet composite, the release layer comprising at least one of the following: an olefinic homopolymer, an olefinic copolymer, or a copolymer of an olefin and a polar comonomer.

15 Claims, No Drawings

RELEASE LINER

FIELD OF THE INVENTION

This invention relates to a release liner and, more particularly, it relates to a fiber-reinforced release liner for pressure-sensitive adhesives.

BACKGROUND OF THE INVENTION

Currently, many tapes and other pressure-sensitive adhesive-coated articles have a release liner applied to the adhesive during or following manufacture. The release liner is typically left in place while the article is laminated, converted, packaged, and shipped to ultimate users, and in many instances is left in place until the article is bonded to an adherend with the pressure-sensitive adhesive. Release liners are often used for one or more of a number of purposes, including, for example, preventing contamination of the adhesive layer, facilitating handling of the adhesive-coated article (e.g., by providing support thereto as well as covering the adhesive), identifying the articles to which they are applied, providing roll stability of articles such as tapes when wound into roll form, etc.

The state-of-the-art in release liner technology for ultra high performance acrylic pressure-sensitive tapes is polyethylene or polypropylene films. These films have been successfully used for many years because they do not require a release coating (e.g. silicones) and can be formulated to possess sufficient stiffness (secant modulus) to support the tape construction through processing, converting, and lamination. Secant modulus has been used for years to predict the processability of a particular liner/tape construction. It relates to the initial stiffness of a film and indicates the ability of a film to support a pressure-sensitive tape through all aspects of processing.

As applications have evolved, conventional polyolefin-based release liners have not been capable of supporting the tape construction sufficiently to avoid stretching the tape during the manufacturing or lamination processes. Conventional liners exhibit a yielding behavior that allows the tape to stretch or elongate by as much as 12+% during the lamination phase of manufacturing. This amount of stretch is a major contributor to liner pop-off in low modulus, pressure-sensitive tape constructions. Strain induced pop-off results from a differential level of stress between the pressure-sensitive tape construction and the polyolefin release liner. In addition to liner modulus, time, temperature, handling, and packaging all contribute to the pop-off problem.

What is needed in the industry is a release liner which greatly minimizes and/or eliminates the pop-off problem and which controls the stretch of the tape during manufacturing operations subsequent to the lamination of the tape to the release liner.

SUMMARY OF THE INVENTION

By the present invention, Applicants have discovered a release liner construction that minimizes or eliminates the pop-off problem during the processing and laminating phases of the tape manufacturing process and which controls the amount of stretch placed on the tape during application.

In one embodiment, the inventive release liner comprises: (a) a reinforced non-woven sheet composite comprising two layers, one of the layers being composed of a plurality of substantially randomly orientated fibers and the other layer being composed of substantially lineally-aligned fibrous reinforcement material; and (b) a release layer on one or more of said layers of said non-woven sheet composite, said release layer comprising at least one of the following: an olefinic homopolymer, an olefinic copolymer, or a copolymer of an olefin and a polar comonomer. The sheet composite and release layer are typically substantially co-extensive over at least that portion of the liner which is contacted to the adhesive coated portion of the article to which the release liner is applied.

In another embodiment of the present invention, the reinforced non-woven sheet composite comprising three layers such that one layer of substantially lineally aligned fibrous reinforcement material is positioned between two layers of substantially randomly orientated fibers.

As disclosed herein earlier, the inventive release liner exhibits minimal elongation during tape processing and manufacturing. Accordingly, the inventive release liner greatly minimizes and/or eliminates the release liner pop-off problem. Additionally, the release liners of this invention can provide effective protection against contamination of the underlying adhesive layer.

Other aspects, advantages, and benefits of the present invention are apparent from the detailed description, examples, and claims.

DETAILED DESCRIPTION OF THE INVENTION

The support sheet utilized in the release liner of the present invention is a non-woven, reinforced sheet composite comprising two fibrous layers. The inventive support sheet may also comprise three layers.

The support sheet typically substantially defines the overall strength characteristics, e.g., secant modulus, tear strength, flexibility, extensibility, tensile strength, etc., of the release liner. During fabrication of the release liner, the support sheet should be able to withstand the stresses necessary for formation of the release 1, a typical application of release on is on adhesive tapes and articles wherein release liners may be subjected to substantial stresses, for instance when drawn through processing equipment during fabrication of an adhesive tape, during storage and shipment of the tape, or during application of the tape to a substrate.

In many instances, the support sheet will preferably provide, without breaking, a tensile force of at least about 1.0, typically more preferably at least about 1.5, pound/inch-width at a strain or elongation of about 1 percent. Depending upon the application for which the release liner is being prepared, support sheets which provide lower tensile forces may be useful or support sheets which provide higher tensile forces may be desirable.

Typically, a release liner will be subjected to tensile stresses during use and it may be desired for the liner to elongate to some extent. However, in some embodiments of the invention, it will be preferred that the support sheet have an elongation of 5 percent, and most preferably 10 percent, i.e., it can be elongated to that extent without breaking. The maximum desired elongation for a particular embodiment of release liners of the invention will be substantially dependent upon the intended application.

It is preferred, however, that the support sheet retain sufficient structural integrity to impart dimensional stability to the release liner and, for example, the adhesive-coated article, when it is elongated. For instance, in applications where release liners of the invention are used on foam-like adhesive tapes such as are used on weather stripping and body side moldings for automobiles, it may be preferred that the support sheet have a tensile force of at least about 7 pounds/inch-width at an elongation of about 20 percent.

The support sheet is preferably substantially non-yielding such that when the release liner is stretched and the tensile forces released, it will tend to recover at approximately the same rate at which a stretched, highly elastic adhesive-coated article recovers [and cause stretching of the release layer or adhesive-coated article to which the release liner is attached].

The support sheet utilized in the release liner of the present invention is nonwoven, e.g., a non-woven web. An advantage of support sheets having holes and interstitial voids therein is that the polymeric material of the release layer may penetrate into, and in some instances penetrate substantially through and saturate, the web. Such penetration typically results in mechanical, as well as adhesive, fastening of the support sheet and release layer, providing a firmer bond therebetween than is provided by interfacial adhesion alone. The non-woven fibers are also bonded integrally within the non-woven matrix. The resultant release liner thus exhibits greater resistance to delamination with easier startability of removal typically being provided.

Non-woven materials are utilized because they typically tend to be dimensionally deformable to a limited degree, but tend to resist yielding at low loads, such that the release liner will remain securely bonded to the adhesive layer when small stresses are applied thereto. For instance, non-woven webs providing a force of at least about 7 pounds/inch-width at an elongation of about 20 percent are useful as support sheets in release liners of the invention for many applications. Typically, as the basis weight of non-woven webs is increased, the force they provide at a specified strain or elongation increases. Thus, non-woven webs may be easily formulated to provide support sheets for liners of the invention having desired properties. Illustrative examples of non-woven webs which may be used herein include spun-bonded, point-bonded, air-laid, dry-laid, wet-laid, thermally-bonded, and resin-bonded webs. The webs are preferably thermally bonded. Webs can be thermally bonded by applying pressure on the web as it is pulled through a heated calendar roll nip.

The support sheet is typically between about 2 and about 15 mils (50 and 375 microns) thick. It will be understood that support sheets having thicknesses outside this range may be used, however, those which are excessively thin may tend to provide insufficient strength and thus be subject to structural failure, e.g., tearing or splitting, whereas those which are excessively thick may tend to be undesirably stiff. The reinforced sheet has a relatively high modulus for the basis weight of the sheet.

One layer of the support sheet is composed of a plurality of substantially randomly orientated fibers, preferably organic fibers. As used herein, the term "substantially randomly orientated layer of fibers" refers to a layer of fibers wherein each fiber lacks directionality to the degree that there is no principle order to the individual fibers in the defined layer. It is a random mix of tangled, diverging, convoluted fibers in a three-dimensional shape. Illustrative examples of such organic fibers that support sheets may be made from include one or more of the following: nylon, polypropylene, polyethylene, polyester, acrylic, cellulosic derivative (e.g., cotton fabric, rayon, acetates, or butyrates), etc. Preferably, the fibers are coextruded to create a sheath/core construction that allows the sheath to act as an adhesive to bond the fibers together and ultimately create a smooth backface surface on the release liner. The smooth backside is of particular importance when it is desired to attach a tab on the liner for easier removal. Since the non-woven fibers are bonded well to each other and the release coating, the tab remains adhered to the liner when it is pulled off, instead of pulling off loose fibers and leaving the release liner on the adhesive.

The other layer of the non-woven reinforced sheet is composed of substantially lineally aligned fibrous reinforcement material, preferably organic reinforcement material. As used herein, the term "substantially lineally aligned fibrous reinforced layer" refers to an ordered layer of individual fibers which possess parallel characteristics with respect to neighboring fibers contained in the layer. Examples of such fibrous reinforcement material include, but are not limited to, glass yarns, polyester yarns, polyethylene yarns, polypropylene yarns, glass matts, woven fibers, scrims, etc. Usable fibers are larger in diameter than the fibers used to form the non-woven. Preferred fiber sizes are 50–500 denier and more preferably, 100 to 300 denier. Preferably, the release liner is free of agents which tend to impair performance of the adhesive coating to which they are applied. For instance, many plasticizers may undesirably affect the adhesion properties of pressure-sensitive adhesives. Also, agents such as silicones may interfere with the adhesive coatings or may contaminate substrates, e.g., automobile body parts that are to be painted. Accordingly, the support sheet is substantially free of migratory plasticizers and silicones to avoid adverse interaction with the pressure-sensitive adhesive layer to which the release liner is contacted.

The release layer imparts to the release liner desired surface adhesion and release characteristics with regard to adhesive coatings to which the liner is to be applied. It also functions to create a coherent surface to which the pressure-sensitive adhesive can be laminated. Preferably, the release layer is substantially continuous such that the support sheet will avoid extensive contact with the adhesive coating to which the release liner is to be applied.

The release layer typically comprises one or more of the following: an olefinic homopolymer or copolymer, or a copolymer of an olefin and at least one polar comonomer, or blends thereof.

Some illustrative examples of homopolymers and copolymers that may be used in the release layer of the release liner of the invention include, but are not limited to, butylene; isobutylene; high, medium, low, and linear low density polyethylene; ethylene vinyl acetate; ethylene acrylic acid; ethylene methyl (meth)acrylate; ethylene butyl acrylate; polypropylene; ethylene/propylene copolymers; and impact resistant ethylene/propylene copolymers. For applications wherein shock resistance at very low temperatures, e.g., below −20° C., is desired, copolymers of ethylene are preferred as they typically exhibit greater shock resistance at low temperature.

In some instances, release liners of the invention may further comprise an optional friction-enhancing agent on the major surface of support sheet opposite the major surface on which the release layer is disposed. In applications where the release liner is to be used on an adhesive-coated article such as dual-functional tape, e.g., coated with a tacky pressure-sensitive adhesive on one side and a tack-free heat-activated adhesive on the other side which is wound into roll form, the back surface of the support sheet will be wound into contact with the heat-activated adhesive-coated side of the tape. If the support sheet and tape exhibit low friction, they may tend to move freely, resulting in poor roll stability. In such instances, it may be desired to select the support sheet from materials as described above which inherently exhibit desired friction with the tape, or to treat the support sheet to increase friction to desired levels, e.g., by applying the friction-enhancing agent thereto. Such agent may be applied in the form of a substantially continuous layer or may be selectively applied in pattern form. Illustrative examples of such agents include ethylene/acrylic acid mixtures containing tackifiers which provide improved performance when applied to polyethylene support sheets for use on release liners used with tapes with back sides made of olefin-based, very low tack heat-activated adhesives.

The release liner can also be used as a carrier for an adhesive transfer tape wherein a pressure-sensitive adhesive is coated onto the liner, cured, and rolled up on the liner. The smooth backside serves as a differential release liner so that the tape can be unrolled.

The following non-limiting examples further illustrate the present invention. Unless otherwise indicated, the following test procedures were used in the Examples.

TEST PROCEDURES

Tensile Force

A 1.27 cm ×17.5 cm sample of the subject release liner is elongated in an INSTRON TM tensile tester or equivalent extension tester with a jaw separation of 12.7 cm and a crosshead speed of 1.27 cm per minute. The force at up to 20 percent elongation of the sample is recorded at the specified elongations. The release liner can also be laminated to a tape construction and the composite is tested as described above.

Peel Adhesion

A sample is prepared by laminating the release side or surface of the subject liner to an adhesive tape and cutting out a 2.5 cm ×17.5 cm strip. The liner is pulled away from the adhesive tape for a distance of about 10 cm on an INSTRON TM tensile tester or equivalent tester at an angle of 180 degrees and a crosshead speed of 30 cm/minute. The force required to remove the liner is measured in Newtons/decimeter. Samples are tested immediately after lamination of the liner to the adhesive tape; after one and four weeks of aging at room temperature (about 20° C.) and at 70° C.

Cold Temperature Performance

The release surface of a 1.27 cm wide strip of the subject liner is adhered to a 1.27 cm wide strip of Y-4234 Weatherstrip Attachment Tape (available from 3M). The exposed side of the tape is then heat-bonded to a flat 2.54 cm wide strip of EPDM (ethylene propylene diene monomer rubber profile extrusion test strip available from Cooper Rubber Company. The strip is cut into 25.4 cm long strips and placed in a −40° C. chamber for 24 hours. The Stage 1 test is conducted by holding a sample strip at each end and twisting 180 degrees along the axial length of the sample. If no pop-off of the liner is observed, the Stage 2 test is conducted. In Stage 2, the same strip is rotated for another 180 degrees for a total twist of 360 degrees. If no liner pop-off is observed, the Stage 3 test is conducted. The strip is untwisted and formed into a circular loop with the liner on the inside of the loop and observed for liner pop-off.

Tear Resistance

A 5.08 cm by 15.24 cm sample is cut with the 5.08 cm dimension being the minor axis and the 15.24 dimension being the major axis. The major axis is the test direction (down web or crossweb). A 1.9 cm notch is cut from one edge at the middle of the minor axis and parallel to the major axis of the sample. The sample is placed in an INSTRON TM tensile tester having a 2.54 cm jaw separation such that the notch is positioned in line with the jaws. The jaws are separated at a speed of 12.7 cm per minute and the average force required to tear the sample is recorded. Samples are run in both the downweb direction and the crossweb direction.

Nonwoven Web A

A nonwoven web was dry air laid on a Rando-Webber nonwoven forming machine (obtained from Rando Corp.) using 80 parts of a 1.2 denier ×3.8 cm polyethylene terephthalate fiber (TREVIRA TM T-121 fiber from Hoechst Celanese Corp.) and 20 parts of a 2.0 denier ×5.1 cm sheath core polyester fiber (CELBOND TM K-54 fiber from Hoechst Celanese Corp.) to a basis weight of about 17 grams per square meter. Multifilament yarns (220 denier Type 68 DACRON TM polyester yarn from DuPont Company), set at 20 ends per inch, were then laminated to the nonwoven web using calender rolls set at 275° F. The resulting nonwoven web had a basis weight of about 40 grams per square meter. The nonwoven web had tensile strengths at varying elongations as shown in Table 1.

Nonwoven Webs B and C

Nonwoven webs were made as Nonwoven Web A except that Web B had 65 parts of T-121 fibers and 35 parts of K-54 fibers. Web C had 50 parts of T-121 fibers and 50 parts of K-54 fibers.

Nonwoven D

A nonwoven web was made with the same nonwoven composition as Nonwoven C, but 150 denier yarns were laminated to the nonwoven web. The nonwoven web was formed on a standard carding machine made by Hergeth.

Nonwoven E

A nonwoven web was made as Nonwoven D without the 150 denier yarns.

TABLE 1

| | Tensile Strength (N/dm) at Elongation (%) shown | | | | | |
|---|---|---|---|---|---|---|
| Web | 1% | 2% | 5% | 10% | 15% | 20% |
| A | 101 | 195 | 329 | 677 | 663 | break |
| B | 141 | 221 | 357 | 701 | 694 | break |
| C | 137 | 237 | 420 | 834 | 769 | break |

EXAMPLE 1-3 AND COMPARATIVES C1-C2

The nonwoven webs A, B, and C, described above, were used to make release liner Examples 1, 2, and 3, respectively. The release liners were made by extruding onto the nonwoven web a 0.076 mm thick layer of resin having 96 parts ethylene vinyl acetate (EVA) and 4 parts of a red pigment (Techmer S-20870E10 pigment from Techmer PM). The EVA was ELVAX TM 265 ethylene vinyl acetate from DuPont Co. The resin was extruded onto the yarn side of the nonwoven at a melt temperature of about 190° C. The liners were tested for tensile force and the test results are shown in Table 2.

Comparative C1 was made as described above using a 34 grams/square meter CEREX TM nylon nonwoven available from Fiberweb North America.

Comparative C2 was a 0.1 mm thick multi-layer polyethylene construction having a 0.018 mm thick layer of high density polyethylene (CHEMPLEX TM 6109 polyethylene from Quantum Chemical Corporation), a 0.07 mm thick layer of medium density polyethylene (60/40 blend of the high and low density polyethylenes respectively), and 0.018 mm low density polyethylene (NORCHEM TM 353 polyethylene from Quantum Chemical Corp.).

The test results show that the liners of the invention have an increasing tensile strength up to 20% elongation. The significance of the increasing tensile strength is that the liner resists stretching and that it requires an increasingly higher tensile force to cause the liner to stretch. By comparison, Example C1 exhibits increasing tensile force but its resistance force is significantly less than the inventive materials. Comparative Example C2, without the reinforcing yarns, increases in tensile force up to a certain amount of elongation after which the tensile strength levels off and the liner no longer resists stretching. At that point, it requires relatively low tensile force to cause a large amount of stretching in the liner construction.

TABLE 2

| Example | Tensile Strength (N/dm) at Elongation (%) shown | | | | | |
|---|---|---|---|---|---|---|
| | 1% | 2% | 5% | 10% | 15% | 20% |
| 1 | 143 | 242 | 382 | 774 | 1172 | 1384 |
| 2 | 150 | 246 | 398 | 819 | 1150 | break |
| 3 | 162 | 261 | 431 | 879 | 1190 | break |
| C1 | 44 | 66 | 105 | 153 | 194 | 230 |
| C2 | 59 | 90 | 131 | 147 | 148 | 145 |

The release liners of Examples 1-3 and Comparative C1 and C3 were laminated to Y-4234 Weather-strip Attachment Tape. The composite comprising the tape and the liner were then tested for tensile strengths at various elongations and the data are shown in Table 3.

TABLE 3

| Example | Tensile Strength (N/dm) at Elongation (%) shown | | | | | |
|---|---|---|---|---|---|---|
| | 1% | 2% | 5% | 10% | 15% | 20% |
| 1 | 148 | 250 | 402 | 764 | 1166 | 1378 |
| 2 | 183 | 283 | 455 | 876 | 1250 | 1430 |
| 3 | 167 | 279 | 463 | 872 | 1204 | 1373 |
| C1 | 71 | 98 | 153 | 215 | 261 | 300 |
| C3 | 86 | 133 | 196 | 229 | 238 | 240 |

EXAMPLES 4-11

Ethylene-containing resins (shown in Table 4) were coated onto Nonwoven Web D at a thickness of 0.1 mm. The ethylene-containing resins had 4 parts of red pigment and were extruded according to the processing conditions described in Example 1. The liners were tested for tensile force at various elongations and results are shown in Table 5. The results show that the tensile strength increases on a positive slope up to 20% elongation and resists stretching, instead of leveling off at a low elongation, thereby permitting little resistance to extensive stretching as shown by Comparative C3. Comparative C3 was made with Nonwoven Web E.

TABLE 4

| Example | Resin Trade Designation | Percent Vinyl acetate | Percent Acrylic Acid |
|---|---|---|---|
| 4 | ELVAX TM 265* | 28 | — |
| 5 | ELVAX TM 4355 | 25 | 6 |
| 6 | ELVAX TM 360 | 25 | — |
| 7 | ELVAX TM 460 | 18 | — |
| 8 | ELVAX TM 560 | 15 | — |
| 9 | ELVAX TM 660 | 12 | — |
| 10 | ELVAX TM 760 | 9.3 | — |
| 11 | DFDA-1137** | 0 | — |

*All ELVAX TM resins are ethylene vinyl acetate resins are from DuPont Company.
**DFDA-1137 polyethylene is a linear low density polyethylene available from Union Carbide Corporation. No pigment was used in this Example.

TABLE 5

| Example | Tensile Strength (N/dm) at Elongation (%) shown | | | | | |
|---|---|---|---|---|---|---|
| | 1% | 2% | 5% | 10% | 15% | 20% |
| 4 | 83 | 141 | 208 | 292 | 367 | 418 |
| 5 | 77 | 138 | 204 | 290 | 366 | 420 |
| 6 | 72 | 127 | 189 | 268 | 337 | 385 |
| 7 | 62 | 123 | 196 | 275 | 350 | 395 |
| 8 | 70 | 128 | 195 | 268 | 345 | 397 |
| 9 | 66 | 123 | 187 | 258 | 321 | 346 |
| 10 | 94 | 146 | 215 | 296 | 373 | 427 |
| 11 | 83 | 140 | 209 | 285 | 351 | 391 |
| C3 | 30 | 48 | 74 | 101 | 72 | 73 |

The liners of Examples 4-11 were laminated to Y-4234 Weather-strip Attachment Tape at room temperature and tested for adhesion and adhesion buildup after heat aging. The test results in Table 6 show that adhesion does not build excessively over time.

TABLE 6

| Example | Release Force - grams/25 mm width | | | | |
|---|---|---|---|---|---|
| | | Room Temperature | | 158° C. | |
| | Initial | 1 week | 4 weeks | 1 week | 4 weeks |
| 4 | 154 | 163 | 159 | 799 | 740 |
| 5 | 490 | 568 | 595 | 1802 | 1244 |
| 6 | 163 | 160 | 145 | 390 | 472 |
| 7 | 168 | 150 | 177 | 277 | 295 |
| 8 | 141 | 163 | 182 | 127 | 132 |
| 9 | 259 | 218 | 236 | 281 | 227 |
| 10 | 336 | 145 | 168 | 191 | 222 |
| 11 | 291 | 250 | 300 | 195 | 204 |

The liners of Examples 4, 5, 7, 10, and 11 were laminated to the Y-4234 Attachment Tape at about 95° C. Test results for adhesion are shown in Table 7. The results show that adhesion does not build to excess when the liner is used, i.e., laminated, at elevated temperatures. Example 5 contains acrylic acid in the EVA formulation which causes the adhesion of the liner to the adhesive to build slightly.

TABLE 7

| Ex-am-ple | Release Force - grams/25 mm width | | | | |
|---|---|---|---|---|---|
| | Room Temperature | | | 158° C. | |
| | Initial | 1 week | 4 weeks | 1 week | 4 weeks |
| 4 | 490 | 336 | 563 | 844 | 790 |
| 5 | 704 | 1008 | 1930 | 790 | 2438 |
| 7 | 209 | 204 | 204 | 304 | 318 |
| 10 | 454 | 218 | 213 | 363 | 263 |
| 11 | 331 | 286 | 295 | 245 | 250 |

The liners of Examples 4–11 were tested for cold temperature adhesion. Results in Table 8 show that the amount of vinyl acetate is preferably above 12% for keeping the liner adhered to the adhesive at cold temperature extremes.

TABLE 8

| Example | Stage 1 | Stage 2 | Stage 3 |
|---|---|---|---|
| 4 | pass | pass | pass |
| 5 | pass | pass | pass |
| 6 | pass | pass | pass |
| 7 | pass | pass | fail |
| 8 | pass | pass | fail |
| 9 | pass | fail | — |
| 10 | fail | — | — |
| 11 | pass | fail | — |

EXAMPLE 12

A release liner was made by extruding a 0.025 mm thick layer of ethylene vinyl acetate (ELVAX TM 265 EVA) onto a nonwoven laminated to a polyester scrim. The nonwoven laminate (available from Nylco Corporation, Nashua, NH) was a 12 grams per square meter REEMAY TM polyester nonwoven (available from Reemay Company) and was laminated to a #416 scrim (6×6 polyester scrim from Nylco Corp.). The #416 scrim had rectangular openings averaging 5mm by 3 mm in dimension.

The sample was tested for tensile force at various elongations and the results are shown in Table 9. The data shows that there is increasing resistance to elongations up to 20% elongation.

TABLE 9

| Ex-am-ple | Tensile Strength (N/dm) at Elongation (%) shown | | | | | |
|---|---|---|---|---|---|---|
| | 1% | 2% | 5% | 10% | 15% | 20% |
| 12 | 57 | 85 | 121 | 166 | 206 | 236 |

Example 12 was compared to Example 4 for tear resistance. The data in Table 10 show that Example 12 had a higher resistance to tearing than Example 4, notably in the downweb direction.

TABLE 10

| Example | Tear resistance - Newtons | |
|---|---|---|
| | Downweb | Crossweb |
| 4 | 3 | 8 |
| 12 | 10 | 10 |

Lamination induced stretching was evaluated using a TS-510 taping head (available from 3M). Tape was bonded to a standard rubber cross-section using sample Example 4 and Comparative C2 in contact with Y-4234 tape. Example 4 exhibited 200% stretch in comparison to 5% stretch observed for C2. Stetching was evaluated by measuring 10" increments onto tape, applying the tape, and measuring the length after bonding. % stretch is the difference in length divided by the original length of tape.

Reasonable variations and modifications are possible from the foregoing disclosure without departing from either the spirit or scope of the present invention.

What is claimed is:

1. A release liner comprising:
   (a) reinforced, non-woven sheet composite comprising two layers, one of the layers being composed of a plurality of substantially randomly orientated fibers and the other layer being composed of substantially lineally-aligned fibrous reinforcement material; and
   (b) a release layer on one or more of said layers of said non-woven sheet composite, said release layer comprising at least one of the following: an olefinic homopolymer, an olefinic copolymer, or a copolymer of an olefin and a polar comonomer.

2. A release liner according to claim 1 wherein said composite further comprises a third layer which is composed of a plurality of substantially randomly oriented fibers wherein said layer of said substantially lineally aligned fibrous reinforcement material is positioned between two layers of said substantially randomly orientated fibers.

3. A release liner according to claim 1 wherein said sheet composite has a tensile force of at least about 1 pound per inch-width at an elongation of about 1 percent.

4. A release liner according to claim 1 wherein said sheet composite has a tensile force of at least about 1.5 pounds per inch-width at an elongation of about 1 percent.

5. A release liner according to claim 1 wherein said sheet composite has an elongation of at least about 5 percent.

6. A release liner according to claim 1 wherein said sheet composite has an elongation of at least about 10 percent.

7. A release liner according to claim 1 wherein said sheet composite has a tensile force of at least about 7 pounds per inch-width at an elongation of about 20 percent.

8. A release liner according to claim 1 wherein said substantially randomly orientated fibers are organic fibers.

9. A release liner according to claim 1 wherein said substantially lineally aligned fibrous reinforced layer is comprised of organic fibers.

10. A release liner according to claim 1 wherein said substantially lineally aligned fibrous reinforced layer is comprised of inorganic fibers.

11. A release liner according to claim 1 wherein said sheet composite has a thickness between about 2 and about 15 mils.

12. A release liner according to claim 1 wherein said composite sheet is substantially free of migratory plasticizers and silicones.

13. A release liner according to claim 1 wherein said release layer is a homopolymer or a copolymer selected from the group consisting of polybutylene, polyisobutylene, polyethylene, a copolymer of ethylene and vinyl acetate, a copolymer of ethylene and acrylic acid, a copolymer of ethylene and methylmethacrylate, a copolymer of ethylene and butyl acrylate, polypropylene, and a copolymer of ethylene and propylene.

14. A release liner according to claim further comprising a friction-enhancing agent on the major surface of said sheet composite opposite the major surface on which said release layer is on.

15. The release liner of claim 14 applied to a pressure-sensitive adhesive layer of an article.

* * * * *

UNITED STATES PATENT AND TRADEMARK OFFICE
CERTIFICATE OF CORRECTION

PATENT NO. : 5,178,924

DATED : January 12, 1993

INVENTOR(S) : Michael A. Johnson and Maurice H. Kuypers

It is certified that error appears in the above-identified patent and that said Letters Patent is hereby corrected as shown below:

Col. 2, lines 41-42   ". . .formation of the release 1, a typical application. . ." should be —. . .formation of the release layer thereon. Further, a typical application. . .—

Col. 2, line 42   ". . .release on is on adhesive tapes. . ." should be —. . .release liners of the invention is on adhesive tapes. . .—

Signed and Sealed this

First Day of February, 1994

Attest:

BRUCE LEHMAN

Attesting Officer     Commissioner of Patents and Trademarks